United States Patent [19]

Bintz

[11] 4,025,081
[45] May 24, 1977

[54] VEHICLE TOWING SUPPORT STRUCTURE

[75] Inventor: Donald H. Bintz, Wautoma, Wis.

[73] Assignee: The Raymond Lee Organization, Inc., New York, N.Y. ; a part interest

[22] Filed: Dec. 29, 1975

[21] Appl. No.: 644,723

[52] U.S. Cl. .............................. 280/7.14; 180/5 R; 280/638

[51] Int. Cl.² .......................................... B60S 9/22

[58] Field of Search ............... 280/7.14, 7.12, 8, 9, 280/10, 11, 13, 14, 20, 27, 28, 47 R, 638, 414 A; 180/5 R, 9.3

[56] References Cited

UNITED STATES PATENTS

| | | | |
|---|---|---|---|
| 2,743,112 | 4/1956 | Lambert | 280/9 |
| 2,817,536 | 12/1957 | Taggert | 280/11 |
| 3,537,117 | 11/1970 | Plesnevich | 280/8 |
| 3,570,616 | 3/1971 | Tominaga | 180/5 R |
| 3,612,566 | 4/1970 | Sholl | 180/5 R |
| 3,697,096 | 10/1972 | Hadley | 280/414 A |
| 3,730,542 | 5/1973 | Chadwick | 280/9 |
| 3,810,662 | 5/1974 | Commanda | 180/5 R |

Primary Examiner—Joseph F. Peters, Jr.
Assistant Examiner—David M. Mitchell
Attorney, Agent, or Firm—Howard I. Podell

[57] ABSTRACT

A vehicle towing support structure, particularly adaptable for installation on a snowmobile, which may be disassembled, when not in use, and stored within the fixed section of the housing permanently mounted to the vehicle. In the assembled form, the structure is in the form of a ski, mounted to a vertical leg fixed to the attached housing unit, with the installed vehicle lifted so that its traction belt or wheel is above the ground surface on which the ski rests. A wheel which is stored elsewhere may be substituted for the ski of the unit. The structure includes a housing box permanently fastened to the structure of an intalled vehicle, two leg sections, which attach to each other and to a slide member mounted in the housing box. A ski is formed of two additional sections that fasten to the leg section, and the unit includes additional brackets and locking pins necessary.

4 Claims, 4 Drawing Figures

U.S. Patent May 24, 1977 4,025,081
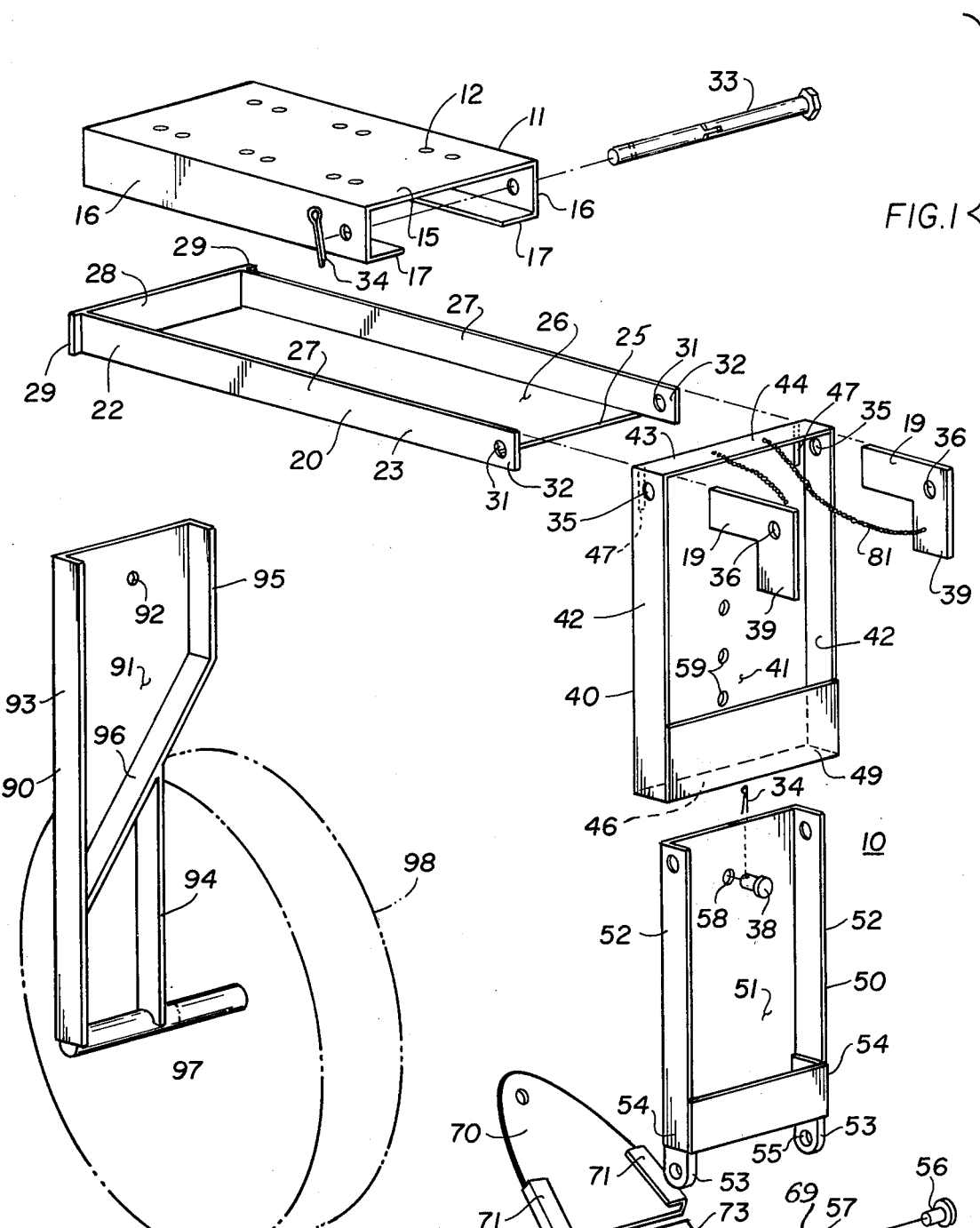
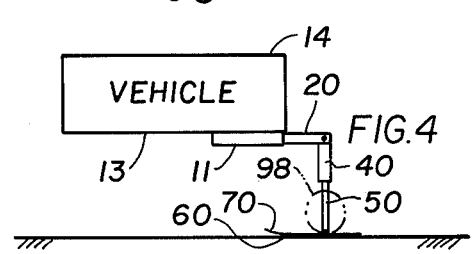

VEHICLE TOWING SUPPORT STRUCTURE

SUMMARY OF THE INVENTION:

My invention is a vehicle towing support structure, particularly adaptable for installation on a snowmobile, which may be disassembled, when not in use, and stored within the fixed section of the housing permanently mounted to the vehicle. In the assembled form, the structure is in the form of a ski, mounted to a vertical leg fixed to the attached housing unit, with the installed vehicle lifted so that its traction belt or wheel is above the ground surface on which the ski rests. A wheel which is stored elsewhere may be substituted for the ski of the unit. The structure includes a housing box permanently fastened to the structure of an installed vehicle, two leg sections, which attach to each other and to a slide member mounted in the housing box. A ski is formed of two additional sections that fasten to the leg section, and the unit includes additional brackets and locking pins necessary.

BRIEF DESCRIPTION OF THE DRAWINGS:

The objects and features of the invention may be understood with reference to the following detailed description of an illustrative embodiment of the invention, taken together with the accompanying drawings in which:

FIG. 1 is an exploded perspective view of the invention;

FIG. 2 is a perspective view of an alternate wheel support member;

FIG. 3 is a schematic diagram of the invention installed in the storage position on a vehicle; and FIG. 4 is a schematic diagram of the invention installed in the fully assembled position on a vehicle for towing purposes.

DESCRIPTION OF THE PREFERRED EMBODIMENT:

Turning now descriptively to the drawings, in which similar reference characters denote similar elements throughout the several views, FIG. 1 illustrates the assembly of the ski-leg structure 10, which is housed, when disassembled, inside of the housing member 11 bolted to the underside 13 of a vehicle 14 as shown in FIG. 3. Housing member 11 is in the form of a plate section 15 perforated with mounting holes 12 and formed with a pair of opposed sides 16 each terminating in an interior flange 17, with sides 16 of a height to permit an enclosed slide frame member 20 to readily slide on flanges 17. Slide frame member 20 is of a greater length than the housing member 11 so that in the storage position, shown in FIG. 3, the forward end 22 of the slide member extends forward of the housing member 11, and in the assembled position, shown in FIG. 4, the rear end 25 of slide frame member 20 extends beyond the housing member 11. Slide frame member 20 is in the form of an open box, with a flat bottom plate 26 bounded by two side bars 27 and with an end plate 28 fixed to the end of the side bars 27 and the plate 26 at the forward end 22 of the frame member 20. A pair of flanges 29 are each fixed to the end plate 28 to project beyond the exterior of each respective side plate 27. The side bars 27 each extend beyond the rear end 25 of the bottom plate 26 with the projected end section 32 of each side bar 27 fitted with a mounting hole 31.

Upper leg section 40 is of a size to fit within slide frame member 20, in the stored position, being formed with a plate section 41 bounded by opposed side bars 42 joined to an end bar 43 at the upper end 44 of the upper leg section 40, with the lower end opening 46 of upper leg section 40 completely open to permit lower leg section 50 to slide through lower opening 46, with a plate section 49 joining the edges of the side bars 42 at the lower end opening 46 of upper leg section 40 to enclose the opening 46.

A pair of parallel spaced slots 47 are fitted in the plate section 41 of upper leg section 40 to each accommodate a leg 19 of an angle 39, in the assembled mode, with a leg 19 projecting through each slot 47 and resting adjacent a side bar 27 of the slide frame member 20. Angles 39 are each fitted with a hole 36 of the diameter of holes 31 in frame slide member 20 and holes 35 in the side bars 42 of upper leg section 40 so that a locking pin 33 may be fitted through holes 36, 31 and 35 and retained in place by cotter pin 34, in the assembled mode.

Lower leg section 50 is formed of a plate section 51 bounded by a pair of side bars 52, with a projection 53 extending from the bottom end 54 of each side bar 52. A hole 55 in each projection 53 is of a size to fit about a mounting pin 56 that engages similar hole 69 in a bracket 57 fixed to main ski-plate 60 with a bracket 57 fixed to each side of ski-plate 60. One or more holes 58 are located in plate section 51 to align, when assembled, with one of several holes 59 of plate section 41 with a pin 38, latched by a cotter pin 34 locking upper and lower leg sections 40 and 50 together in one of several extended positions.

Toe plate 70 is formed with U-shaped flanges 71 to fit about the forward section 73 of main ski-plate 60 with forward section 73 bent upwards from the plane of the balance of the ski-plate 60.

A chain 81 may fastened to each bracket 39 and to the upper leg section 40.

FIG. 2 illustrates an axle plate 90 which may be substituted for lower leg section 50 for mounting to a wheel 98 instead of a ski 60. Leg section 90 is formed with a plate section 91 in which a hole 92 is located of a size to fit pin 38. Plate section 91 is reinforced by side bars 93, 94 and 95 and by diagonal rib 96, with an axle 97 projecting from the side of axle plate 90 on which a wheel 98 may be mounted.

In the stored condition shown in FIG. 3, ski plate 60 and toe plate 70 are mounted within lower leg member 50 which fits inside of upper leg section 40. Together with brackets 39 and pins 56 and 58 inside of upper leg section 40, upper leg section 40 is mounted inside of slide frame member 20 which is slidably mounted inside of housing 11.

Since obvious changes may be made in the specific embodiment of the invention described herein, such modifications being within the spirit and scope of the invention claimed, it is indicated that all matter contained herein is intended as illustrative and not as limiting in scope.

Having thus described the invention what I claim as new and desire to secure by Letters Patent of the United States is:

1. An assembly of parts for providing an extended leg support to a vehicle on which a ground engaging member may be mounted, comprising
   a housing, adaptable for fastening to the frame of a vehicle, a slidable member mounted in said housing so as to be slidable in the horizontal plane with respect to the housing, in the installed position of the housing, a pair of leg sections, which leg sections serve in the extended position of use as an upper leg section and a lower leg section respectively, with each of said leg sections of a size to be stored together in the housing, when not in use, a ground engaging member, first attachment means selectively connecting the upper leg section to said slidable member at a right angle to said slidable member, second attachment means selectively connecting said upper leg section to the lower leg section in the same vertical plane, third attachment means connecting said ground engaging member to the lower leg section, wherein the apparatus may be stored by disconnecting said first, second and third attachment means and placing at least the leg sections within the slidable member.

2. The assembly as recited in claim 1 in which the ground engaging member is a ski of a size to be stored in the housing.

3. The assembly as recited in claim 2 together with a wheel rotatably joined to a frame, said frame fitted with detachable means to attach to a leg section, as a substitute for the ski.

4. The combination as recited in claim 2 in which the ski is formed of two detachable sections.

* * * * *